United States Patent [19]
Tschantz

[11] 3,838,824
[45] Oct. 1, 1974

[54] AUTOMATIC MEAT MIXER AND GRINDER

[75] Inventor: William H. Tschantz, Kensington, Ohio

[73] Assignee: The Biro Manufacturing Company, Marblehead, Ohio

[22] Filed: Feb. 26, 1973

[21] Appl. No.: 335,931

[52] U.S. Cl. ............... 241/101 B, 241/152 A
[51] Int. Cl. ................................ B02c 18/00
[58] Field of Search...... 241/98, 101 B, 101.6, 82.2, 241/.4, .5, 86.2, 88.4, 15 A, 15 R, 282.1

[56] References Cited
UNITED STATES PATENTS

| | | | |
|---|---|---|---|
| 1,468,967 | 9/1923 | Hottmann | 241/98 X |
| 1,736,333 | 11/1929 | Van Hooydonk | 241/152 X |
| 2,918,956 | 12/1959 | Otto | 241/98 X |
| 3,599,687 | 8/1971 | Tschantz | 241/82.6 |

*Primary Examiner*—Roy Lake
*Assistant Examiner*—E. F. Desmond
*Attorney, Agent, or Firm*—Joseph Frease; Michael Sand

[57] ABSTRACT

A machine for automatically grinding and mixing large quantities of fresh and frozen meats including a cylindrical tub with a flat bottom wall. A reversible rotatable centerpost housing in the tub supports in a general radial position a pair of vertically extending paddle-like pusher plates and a rotary knife assembly. The knife assembly has a series of cutting blades mounted on a shaft extending from the centerpost housing, and a pivotally mounted grate through which the front portions of the blades extend. The rotating blades cut, chop and grind the meat which collects in front of the grate as the centerpost housing rotates for a preset time interval in a forward or cutting direction. The pusher plates are hinged at their upper ends permitting the plates to swing upwardly and drag across the top of the meat in the tub when the centerpost housing revolves in the cutting direction. After the meat is chopped and ground to the desired consistency, the rotation of the centerpost housing is reversed and the pusher plates move the meat along the tub bottom into a feed screw auger which discharges the meat from the tub.

14 Claims, 10 Drawing Figures

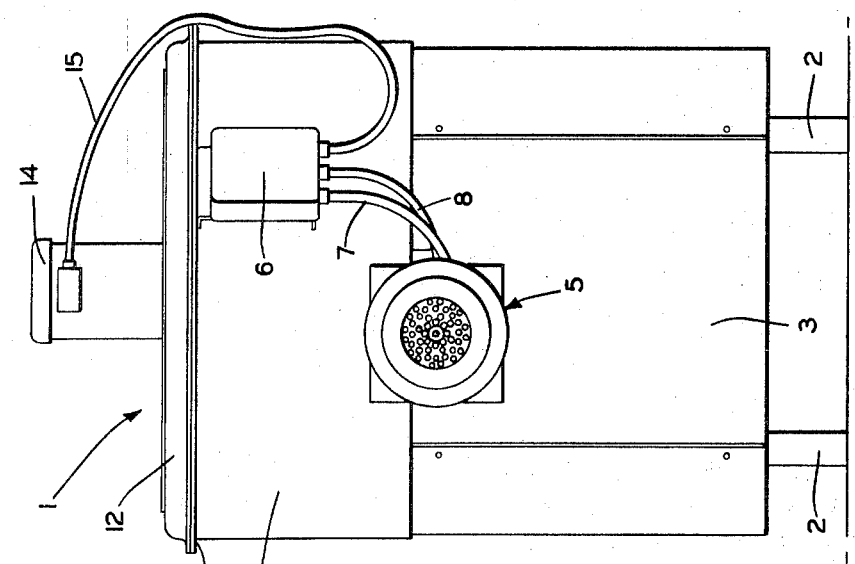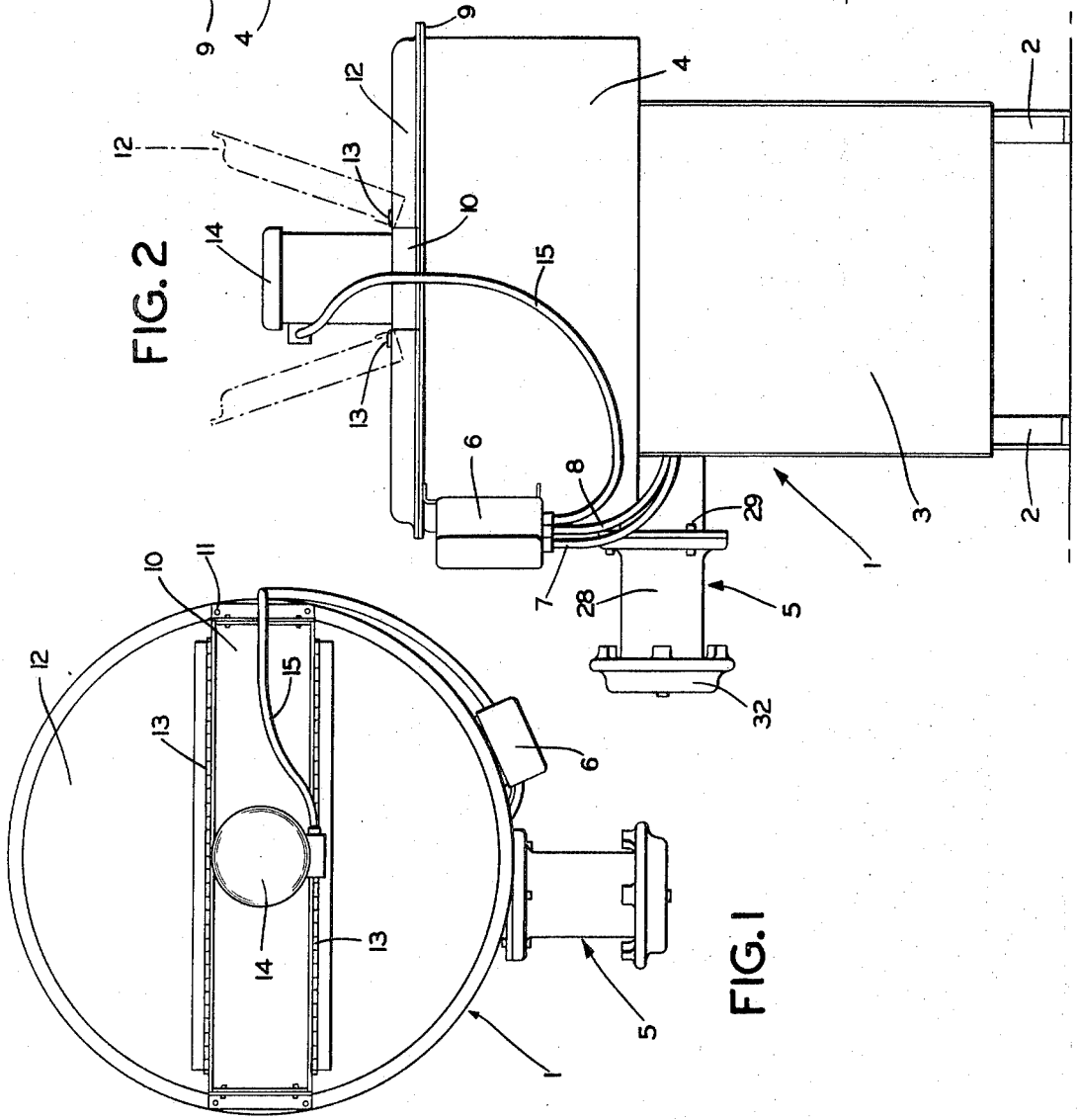

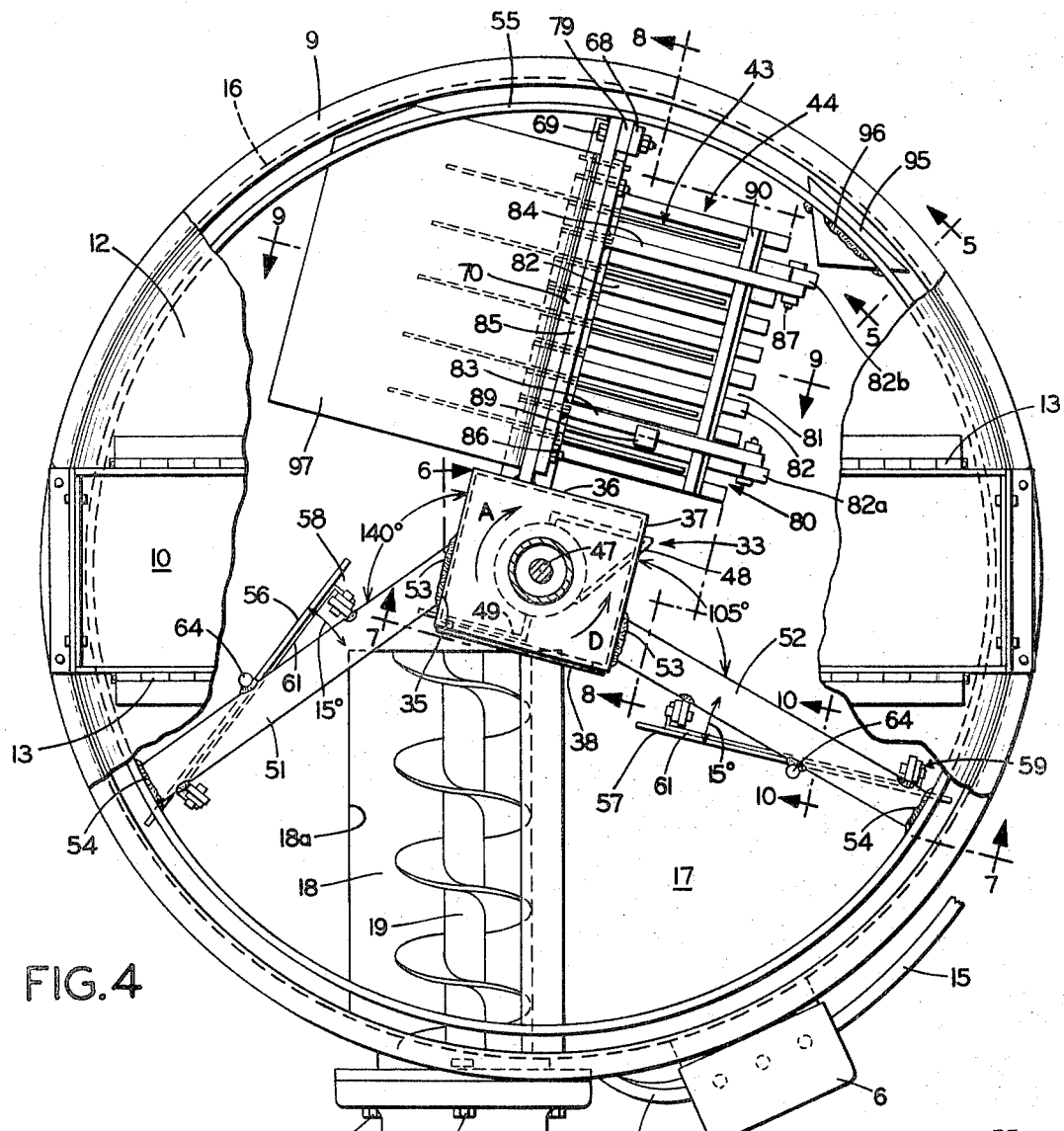
FIG. 4
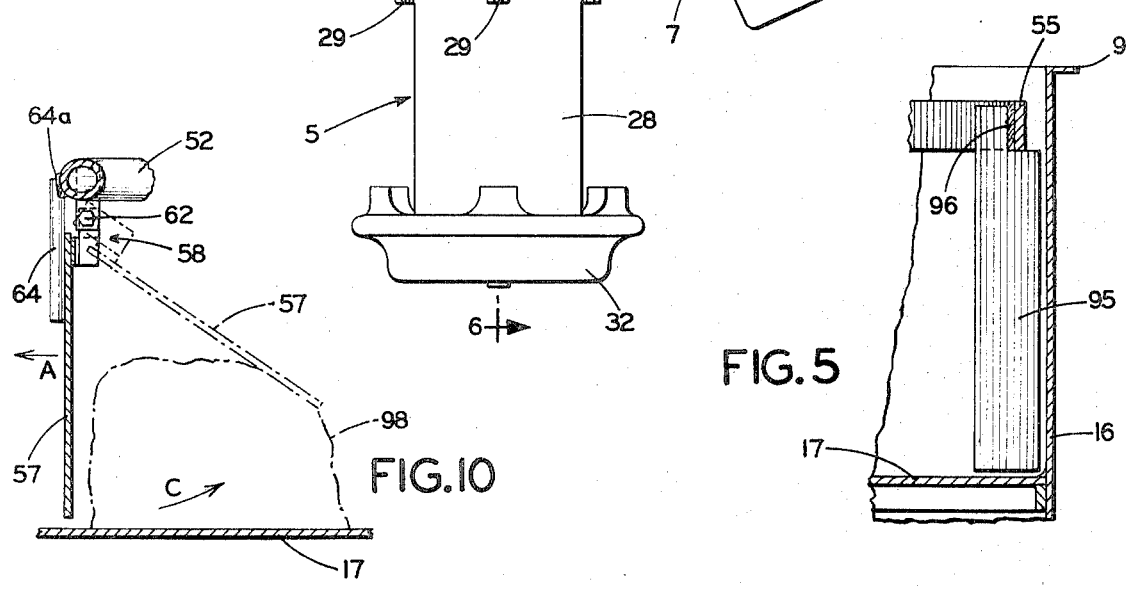
FIG. 10
FIG. 5

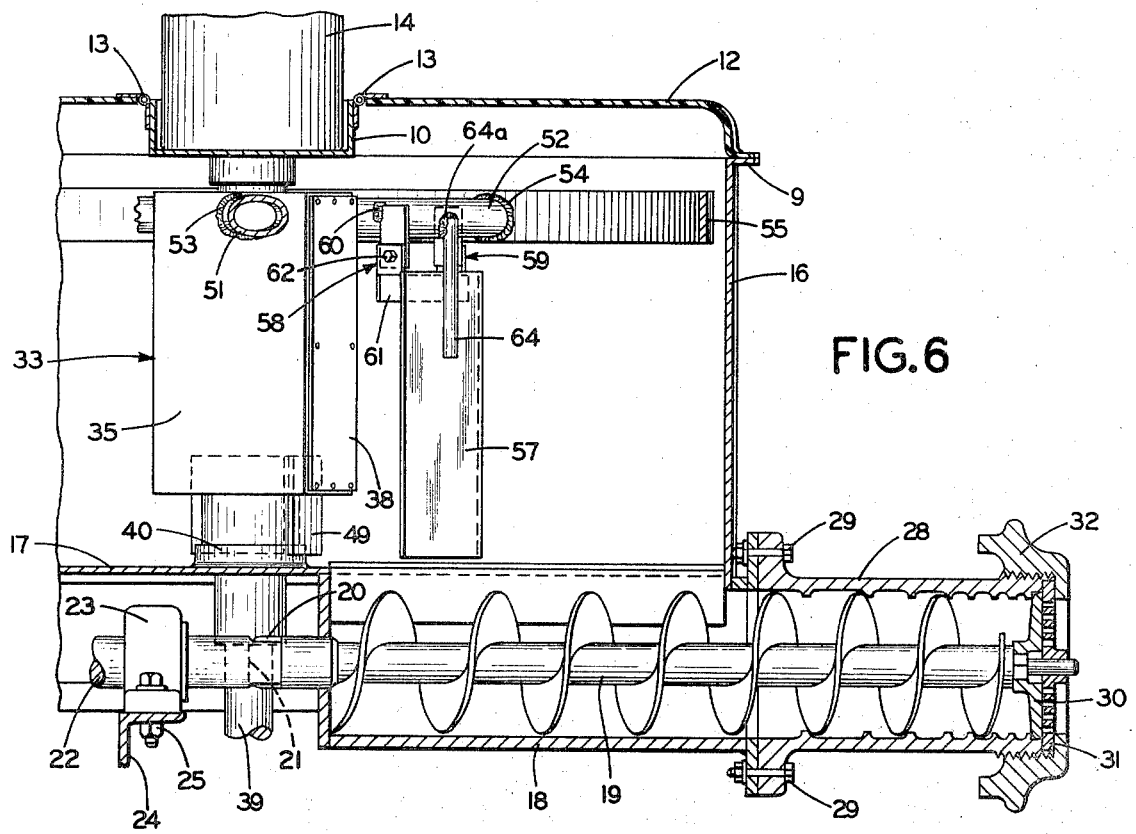

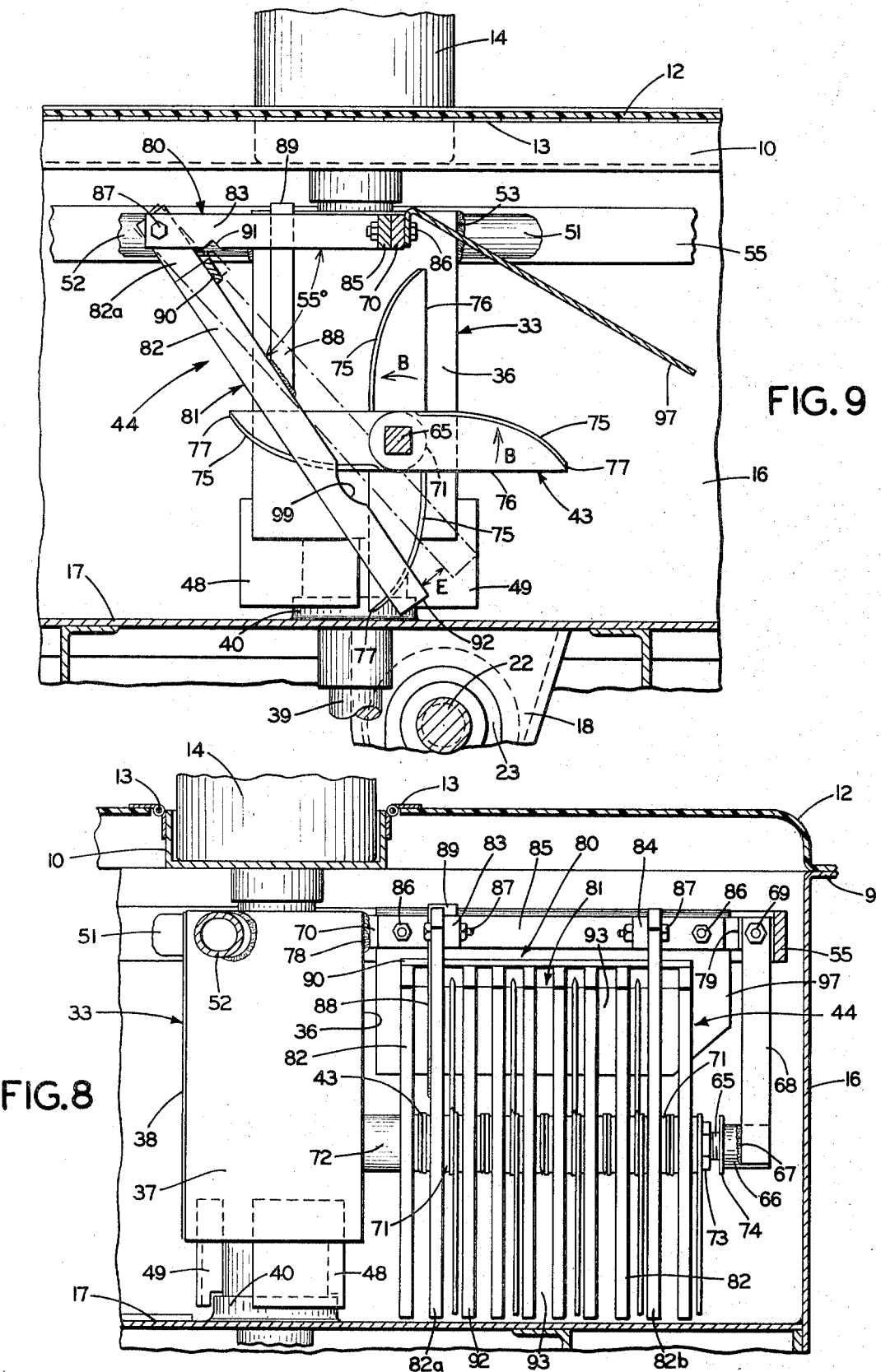

AUTOMATIC MEAT MIXER AND GRINDER

CROSS REFERENCES TO RELATED PATENTS

The invention involves improvements in the meat mixer and grinder construction shown in my U.S. Pat. No. 3,599,687, issued Aug. 17, 1971.

BACKGROUND OF THE INVENTION

1. Field of the Invention

The invention relates to food processing equipment and in particular to a meat processing machine especially constructed for mixing and grinding large quantities of meat in a minimum of time. More particularly, the invention relates to an improved meat mixing and grinding machine which permits the deposited meat to be chopped to the desired consistency before discharging the same from the machine.

2. Description of the Prior Art

The large chains of supermarkets and the like, butcher, process and package meat at one central commissary and then truck the prepackaged meat to the various stores, thus doing away with a butcher at each store or market.

This necessitates the processing and butchering of the meat in a minimum of time. For instance, in preparing large quantities of ground meat products, automatic equipment is being used for mixing and grinding 200 to 400 pounds of meat in one batch. The present invention is designed for thoroughly and uniformly mixing and grinding large quantities of meat in a minimum of time, such as 5,000 pounds in approximately 1 hour.

Numerous machines have been constructed for automatically mixing, grinding and chopping such large quantities of meat, as disclosed in Hottman U.S. Pat. No. 1,416,204 in which the meat is mixed in a cylindrical tub by rotary paddles and fed therefrom by a feed screw into a food chopper. Other types of recent mixing and grinding machines for meat products are shown in U.S. Pat. Nos. 3,450,180 and 3,461,934.

My previous machine, described in U.S. Pat. No. 3,599,687, uses rotary paddles of different lengths and at different angles, some of which push the meat toward the center of the tub and others of which push the meat outward from the center. The meat then is conveyed by a power-driven feed screw through a rotating blade and perforated plate located at the outer end of the feed screw to chop the meat.

In order to secure the desired degree of fineness and consistency of the mixed and chopped meat produced by prior machines, it was necessary to feed the output of the machine directly into a similar machine for another mixing and grinding operation.

SUMMARY OF THE INVENTION

Objectives of the invention include providing a meat mixer and grinder having an open top, flat bottom container with a bottom opening formed therein which communicates with a screw conveyor which discharges mixed and ground meat from the container; providing a meat mixer and grinder having a rotatable centerpost housing in the container which supports and rotates a series of hinge mounted paddle-like plates which when rotated in one direction wipe over the meat within the container, and when rotated in the opposite direction push the mixed and chopped meat into the screw conveyor; providing a meat mixer and grinding having a knife assembly connected to the centerpost housing which is rotated about the vertical axis of the container centerpost, and which knife assembly has a horizontal power driven shaft extending generally radially outwardly from the centerpost on which a plurality of cutting blades are mounted; in which the knife assembly further includes a grate or grill pivotally mounted at its top edge which extends in an upwardly forwardly directed angle ahead of the rotary knife blade shaft, and in which the knife blades move through the grate slots and cut downwardly and rearwardly into the mass of meat confined below the grate; providing a meat mixer and grinder in which the container centerpost revolves the knife assembly and plates a predetermined number of revolutions first in one direction within the container with the knife blades rotating downwardly into the meat to chop and grind the meat to the desired consistency, and then revolves the plates and knife assembly in the opposite direction with the knife blades stationary with respect to their horizontal mounting shaft, with the plates pushing the chopped and ground meat into the screw conveyor opening for discharge from the container; and providing a meat mixer and grinder which eliminates double grinding steps heretofore required and which accomplishes both grinding and mixing in a fast, safe and efficient manner which could not be accomplished in the curved bottom hopper tubs of the prior art.

These objectives and advantages are obtained by the meat mixer and grinder construction, the general nature of which may be stated as including a cylindrical tub having a flat bottom wall adapted to receive a quantity of meat; a central vertical post in the tub; means for rotating the post in forward and reverse directions; arm means mounted on the central post and extending toward the tub periphery; paddle means pivotally mounted on the arm means and extending vertically downwardly therefrom terminating adjacent the tub bottom wall; the paddle means being adapted to swing upwardly rearwardly wiping across the top of the meat within the tub when the central post rotates in the forward direction; cutter means mounted on the central post and extending outwardly therefrom toward the tub periphery; the cutter means including a horizontal shaft having a plurality of knives mounted thereon, and grate means; means for rotating the shaft and knives in a forward direction; the grate means being in an upwardly forwardly inclined position forward of the shaft and cooperatively associated therewith whereby the knives move downwardly through slots formed in the grate means when the central post moves in the forward direction cutting and mixing the meat in the tub which is forced downwardly along the inclined grate means toward the tub bottom wall; a generally radially disposed auger trough formed in the bottom wall of the tub; a feed screw in said trough; means for rotating the feed screw; and stop means engageable with the paddle means preventing the paddle means from swinging forwardly beyond vertical position when the central post rotates in the reverse direction whreby the paddle means pushes the cut and mixed meat along the bottom wall of the tub into the auger trough, where said feed screw discharges the meat from the tub.

BRIEF DESCRIPTION OF THE DRAWINGS

A preferred embodiment of the invention - illustrative of the best mode in which applicant has contem- FIG. 1 is a top plan view of the improved automatic meat mixer and grinder;

FIG. 2 is a righthand side elevation of the improved mixer-grinder construction with the cover shown in dot-dash lines in raised position;

FIG. 3 is a front elevation of the mixer-grinder construction shown in FIGS. 1 and 2;

FIG. 4 is an enlarged top plan view of the mixer-grinder construction with parts broken away;

FIG. 5 is a fragmentary sectional view taken on line 5—5, FIG. 4;

FIG. 6 is a fragmentary sectional view taken on line 6—6, FIG. 4 showing the feed screw trough and one of the meat pusher plates;

FIG. 7 is an enlarged fragmentary sectional view taken on line 7—7, FIG. 4, showing one of the meat pusher plates;

FIG. 8 is an enlarged fragmentary sectional view taken on line 8—8, FIG. 4, showing the knife assembly;

FIG. 9 is an enlarged fragmentary sectional view taken on line 9—9, FIG. 4, showing another view of the knife assembly; and FIG. 10 is a fragmentary sectional view taken on line 10—10, FIG. 4, with one of the meat pusher plates (shown in dotdash lines) being pivoted upwardly by a meat mixture.

Similar numerals refer to similar parts throughout the drawings.

DESCRIPTION OF THE PREFERRED EMBODIMENT

The improved automatic meat mixer and grinder is indicated at 1 and shown generally in FIGS. 1-3. Mixer-grinder 1 is supported by frame uprights 2 and has a base cabinet 3 in which some of the drive motors and controls therefor are located.

A cylindrical tub 4 is supported on top of cabinet 3 and communicates with an outwardly extending screw feed assembly 5. An electric control cabinet 6 is mounted on the outer surface of tub 4 and is connected to the drive motor assembly within base 3 by electric cables 7 and 8.

The upper end of tub 4 terminates in an outwardly extending flange 9. A channel member 10 extends diametrically across the open top of tub 4 and is mounted on flange 9 by bolts 11. A domed cover 12 of transparent plastic or the like, is mounted by hinges 13 to channel 10 to keep dust and other foreign matter from contaminating the meat mixture being processed in tub 4.

A motor 14 for driving the grinding and chopping knives of mixer-grinder 1 is mounted on channel 10 and is electrically connected to control cabinet 6 by cable 15.

Tub 4 includes a cylindrical side wall 16 and a flat bottom wall 17. A usual, generally radially disposed auger trough 18 (FIGS. 4 and 6) is formed in bottom wall 17 of tub 4 and communicates with a rectangular opening 18a formed in wall 17. Trough 18 extends from adjacent the center of the tub to the periphery thereof. An auger or feed screw 19 (FIG. 6) is located in auger trough 18 and has a flat tongue 20 at its inner end. Tongue 20 is received in a slot 21 formed in the adjacent end of an auger drive shaft 22 so that auger 19 will be rotated thereby for feeding a meat mixture outwardly from tub 4. Auger shaft 22 is journaled in bearing 23 mounted on base frame member 24 by bolts 25 (FIGS. 6 and 9). Shaft 22 in turn is connected to and power-driven by usual drive means, such as disclosed in U.S. Pat. No. 3,599,687.

Screw feed assembly 5 includes a cylindrical housing 28 which is connected by bolts 29 to the outer end of auger trough 18. A usual rotary blade 30 is mounted on the outer end of auger 19 which cooperates with a perforate plate 31. A flanged screw threaded ring 32 retains blade 30 and plate 31 within auger housing 28 and provides access within housing 28.

The construction and operation of auger 19 and trough 18 and their cooperation with tub 4 is similar to the construction and operation of the trough and auger shown and described in U.S. Pat. No. 3,599,687.

A rotatable vertical centerpost housing 33 is located at the center of tub 4 and is formed by rectangular side walls 34, 35, 36 and 37, with an open side 34 being closed by a coverplate 38. A vertical shaft 39 is journaled through a bushing 40 surrounding a central aperture in tub bottom wall 17 (FIG. 7) and extends into housing 33 and engages elements in a gear reduction box 41. The lower end of shaft 39 is connected to the mixer-grinder power drive assembly located within base cabinet 3 in a usual manner.

A right-angle gear box 42 is mounted on gear box 41 to drive the cutting knife blades 43 of a knife or cutter assembly 44 described in detail below. A coupling 45 connects the upper end 46 of vertical shaft 39 to shaft 47 of motor 14.

A triangular-shaped plate 48 and an L-shaped plate 49 are mounted on the lower end of centerpost housing 33 and shaft 39 by welds 50 (FIGS. 4 and 7) for pushing the meat mixture within tub 4 away from shaft 39.

In accordance with the invention, a pair of tubular arms 51 and 52 extend generally radially from centerpost housing 33 toward the periphery of tub 4. The inner ends of arms 51 and 52 are welded at 53 to the top of housing side walls 35 and 37, respectively, with the outer arm ends being welded at 54 to a ring member 55. Ring 55 is concentric to tub 4 and is located adjacent tub flange 9 within the open top of tub 4 (FIG. 4).

Arms 51 and 52 preferably do not extend on true radial lines from the center of tub 4, but are connected to housing 33 adjacent ends thereof and extend parallel with radial lines, as is illustrated in FIG. 4. Arms 51 and 52 are spaced approximately 120° apart and extend outwardly from housing side walls 35 and 37 at approximate angles of 105° and 140°, respectively.

Paddle-like plates 56 and 57 are pivotally mounted at their top ends on arms 51 and 52, respectively, and extend vertically downwardly therefrom (FIGS. 4 and 7). Paddles 56 and 57 extend across arms 51 and 52 at angles of approximately 15° therewith and are suspended from their respective arms by pairs of spaced brackets 58 and 59. The top ends of brackets 58 and 59 are welded at 60 to opposite sides of arms 51 and 52 with the lower bracket ends connected to U-shaped straps 61 mounted on and extending across the top portions of paddles 56 and 57. The upper and lower ends of brackets 58 and 59 are pivotally connected by bolts 62 and 63, respectively.

A rod 64 is welded at 64a to each arm 51 and 52 and extends vertically downwardly along each paddle 56 and 57 preventing the paddles from swinging beyond the vertical position in one direction and permitting complete freedom of swinging movement in the opposite direction. Paddles 56 and 57 preferably are rectangularly shaped and terminate close to the adjacent tub side and bottom walls 16 and 17, as seen in FIG. 7.

Also, in accordance with the invention, a rotary knife or cutter assembly 44 (FIGS. 4, 8 and 9) is mounted on centerpost housing 33, located between housing 33 and tub ring 55, for performing cutting, grinding, chopping and mixing actions on a meat mixture within tub 4.

Knife assembly 44 includes a horizontal shaft 65 extending generally offset radially from centerpost housing 33. The inner end of shaft 65 is connected to right-angle gear box 42 for rotating shaft 65 by drive motor 14 mounted on top of grinder-mixer 1. The outer end of shaft 65 is journaled for rotation within a bearing 66 which is welded at 67 to a vertical frame post 68. Post 68 is bolted at 69 to a horizontal frame member 70 extending generally radially from housing 33.

A series of knife blades 43 are spaced along the squared intermediate portion of shaft 65 separated by intermediate spacers 71. An end spacer 72 positions innermost blade 43 with respect to housing 33, and a nut 73 at the outer end of shaft 65 retains blades 43 and spacers 71 and 72 on shaft 65. A washer 74 retains bearing 66 in proper space relationship with respect to the outermost blade 43 and nut 73 (FIG. 8).

Knife blades 43 (FIG. 9) are positioned along shaft 65 in an alternate arrangement whereby the longitudinal axes of adjacent blades 43 are normal to each other. Each blade 43 is flat and has a general parallelogram configuration with diagonally opposite edges 75 being gradually convexly curved and tapered to form the cutting edges of blades 43. The remaining pair of opposite edges 76 is blunt. The tips 77 of blades 43 preferably are flat and blunt.

Knife assembly frame member 70 is welded at 78 to housing side wall 36 and is bolted at its outer end at 69 to vertical post 68 and to a tub ring lug 79. A slotted grate or grill assembly indicated at 80 (FIGS. 4, 8 and 9) is suspended from frame member 70 and cooperates with knives 43 to achieve the desired cutting, chopping, grinding and mixing of the meat.

A grate 81 consisting of a plurality of spaced bars 82 is suspended from a pair of horizontally extending, inner and outer bars 83 and 84 mounted on a generally radially extending bar 85. Bar 85 is aligned with and is mounted on frame member 70 which extends outwardly from centerpost housing 33, by bolts 86.

Grate bars 82a and 82b of grate 81 extend upwardly beyond the upper ends of the remaining bars 82 and are pivotally connected by bolts 87 to horizontal bars 83 and 84 to provide the pivotal mounting and suspension of grate 81 on horizontal bars 83 and 84. A post 88 extends vertically upward from grate bar 82a and has a lug 89 at the top end (FIG. 9) which abuts horizontal bar 83 to limit the downward swing of grate 81. The usual operating or suspended position of grate 81 is shown in full lines in FIG. 9.

A reinforcing bar 90 extends across the tops of individual bars 82 preventing any lateral movement therebetween and functioning as a stop member limiting the upward swing of grate 81. Notches 91 are formed in the lower portions of horizontal bars 83 and 84 to receive bar 90 when grate 81 is in its uppermost pivoted position. An intermediate grate position is shown in dot-dash lines, FIG. 9.

Grate 81 extends in an upwardly forwardly directed angle ahead of knife blades 43, as related to the clockwise or forward rotational direction (arrow A, FIG. 4) of centerpost housing 33. Grate 81 is at an angle of approximately 55° with respect to bars 83 and 84 in suspended position. The lower edges 92 of grate bars 82 are spaced slightly above bottom tub wall 17 and rearwardly of blade tips 77, when blades 43 are in a downwardly vertical extending position, as shown in FIG. 9.

Knife blades 43 and grate bars 82 are spaced so that blade 43 moves through grate slots 93 formed between grate bars 82 with a minimum of clearance between the blade faces and the sides of bars 82.

A triangular member 95 (FIGS. 4 and 5) is welded at 96 to tub ring 55 and is spaced forwardly of knife assembly 44. Member 95 assists in dislodging meat from tub side wall 16 and for moving the meat towards the tub center as housing 33, paddles 56 and 57, and knife assembly 44 rotate within tub 4.

An inclined plate 97 is attached by bolts 86 to the rear side of frame member 70 and extends downwardly above knife blades 43. Plate 97 functions as a safety guard for blades 43 and as a deflector for bits of meat which fly off rotating blades 43.

The power drive mechanism and the controls therefor may have various arrangements and component somewhat similar to the drive mechanism and control shown in U.S. Pat. No. 3,599,687. A typical drive mechanism may contain a 10 HP motor for feed screw 19 and a 3 HP reversible motor for revolving centerpost housing 33, both of which are housed within base cabinet 3. Motor 14 mounted on top of tub 4 would have a 2 HP rating for driving cutter shaft 65 and knife blades 43 mounted thereon. A typical example of the controls for the drive mechanism is described below in the operational description of the grinder-mixer 1.

In a usual mixing and grinding operation, a quantity of ground meat products is placed in tub 4 and domed cover 12 is moved to closed position. An operator presses a start button preferably located in control cabinet 6 which energizes the reversible centerpost housing motor which rotates centerpost housing 33 in a clockwise forward dirction (Arrow A, FIG. 4) and simultaneously energizes knife assembly motor 14. Motor 14 rotates shaft 65 and blades 43 in a counterclockwise direction (Arrows B, FIG. 9).

Centerpost housing 33 together with knife assembly 44, triangular scraper 95, and paddles 56 and 57 rotate in the forward direction for a preset time period or a predetermined number of revolutions. Paddles 56 and 57 swing rearwardly upwardly (Arrow C, FIG. 10) about pivot bolts 62 and 63 from their usual vertical position (solid lines, FIG. 10) upon contacting a quantity of meat 98 deposited in tub 4. Thus, paddles 56 and 57 drag across the top of the meat 98 in tub 4 as centerpost 33 rotates in the forward or mixing-grinding direction with paddles 56 and 57 having no appreciable effect on the meat.

Grate 81 assumes the inclined position, shown in solid lines FIG. 9 with lower edges 92 of bars 82 being spaced a slight distance about tub bottom wall 17, as shown, controlling in part the degree of fineness of the meat ground in tub 4. Grate 81 pivots rearwardly upwardly (Arrow E, FIG. 9) about pivot bolts 87 when grate 81 encounters a chunk of meat too big to be cut through in the usual manner by blades 43 as shaft 65 revolves within tub 4. A notch 99 is formed in the lower portion of each grate bar 82 and has a radius of curvature approximately equal to the radius of spacers 71 on shaft 65 to limit the upward rearward swing of grate 81.

Grate 81 wipes along the meat resting on flat bottom wall 17 of tub 4 directing the meat downwardly toward the underside of the grate toward wall 17 as the curved sharpened edges 75 of blades 43 cut downwardly and rearwardly into the mass of meat so confined below grate 81. It has been found that lower end 92 of grate 81 should be located slightly behind the vertical centerline plane of knife shaft 65, (FIG. 9) to achieve the most effective cutting and mixing action.

As centerpost housing 33 revolves clockwise within tub 4 with knife blades 43 rotating counterclockwise on shaft 65, the meat therein is uniformly cut, chopped and completely mixed. The degree of fineness of grind and completeness of mixing may be generally controlled by the clearance between blades 43 and tub bottom wall 17, the clearance between grate bottom end 92 and tub wall 17, the number of revolutions of rotary knife assembly 44 within tub 4, as well as the thickness of knife blades 43 and the width of slots 93 in grate 81 between bars 82.

After a preset number of revolutions off centerpost housing 33 or after a preset time interval, usual switch means within control cabinet 6 automatically de-energizes knife assembly motor 14 and reverses the rotational direction of the centerpost housing drive motor, thereby rotating centerpost housing 33 and attached knife and paddle assemblies in a counterclockwise or reverse meat discharge direction (Arrow D, FIG. 4). The auger feed screw motor is energized simultaneously upon reversing the centerpost housing drive motor and de-energizing motor 14, for feeding the now completely ground and mixed meat from tub 4 through trough opening 18a, trough 18 and auger housing 28.

During this reverse or discharge rotational direction (Arrow D, FIG. 4), paddles 56 and 57 swing to a vertical position due to their own weight and due to the resistance of the meat mixture acting thereon, and are held against any forward swing by retaining rods 64. Paddles 56 and 57 wipe along bottom wall 17 and cylindrical side wall 16 of tub 4 pushing the ground and mixed meat through trough opening 18a in bottom wall 17 into trough 18 and revolving auger 19. Auger 19 moves the meat along auger housing 28 past additional cutting blades 30 and through perforate plate 31, discharging the meat from tub 4 into a receiving receptacle or the like.

Triangular scraper 95 dislodges meat particles clinging to side wall 16 of tub 4 and pushes the meat mixture toward the center of tub 4. Centerpost housing plates 48 and 49 push the meat mixture outwardly from the tub 4 preventing a buildup about centerpost housing 33.

The centerpost housing and the auger drive motors are automatically de-energized by appropriate control means after a preset number of counterclockwise revolutions of centerpost housing 33 or after a predetermined time interval of sufficient duration to empty tub 4 of the mixed meat.

The offset arrangement of the blade shaft 65 and the normal position of blades 43 with respect to shaft 65, together with the position of blades 43 with respect to the circumference of tub 4, stimulates the mixing effect produced by blades 43 and prevents grooving of the blades in the cut meat mixture as knife assembly 44 revolves within tub 4.

The relatively flat curvature of blade cutting edges 75 and blunt ends 77, taken with cooperating grate 81 and the location of the axis of cutter shaft 65 produce the desired and highly efficient mixing action heretofore unobtainable with prior mixer-grinder constructions.

The orientation of paddles 56 and 57 in vertical pushing position when centerpost housing 33 is moving in the reverse rotational direction (arrow D, FIG. 4) is important in that the outer ends of paddles 56 and 57 extend outwardly and forwardly of the direction of rotation at an angle to the radial, and that the paddles have their trailing edges adjacent housing 33 behind or trailing a vertical plane passing through the axis of housing 33 and a vertical line extending generally centrally of the paddles between their inner and outer edges.

This relative location of paddles 56 and 57 with respect to the axis of centerpost housing 33 and tub bottom wall 17 (FIG. 4) is important so that the meat when pushed by paddles 56 and 57 will fall by gravity through trough opening 18a and into trough 18 without bridging across opening 18a. It has been discovered that a meat mixture has a tendency to bridge across opening 18a when the meat is pushed by true radially extending plates since the compressed meat mixture will align generally with opening 18a when the pusher paddles register therewith.

The use of improved mixer-grinder 1 eliminates double grinding steps heretofore required, and accomplishes both complete and thorough grinding and mixing in tub 4 more effectively than can be accomplished in the curved bottom hopper tubes of the prior art.

Accordingly, improved mixer-grinder 1 provides for completely grinding, chopping and mixing a quantity of meat placed within tub 4 by rotating centerpost housing 33 first in a cutting and mixing direction a number of revolutions necessary to achieve the desired meat consistency and then reversing the direction of rotation to discharge the meat mixture from tub 4; eliminates the duplicate mixing and grinding procedure heretofore required with prior mixer-grinder constructions; enables greater efficiency to be achieved in the operation of the mixer-grinder; and provides a construction which is effective, safe, and efficient in assembly, operation and use, and which achieves all the enumerated objectives, provides for eliminating difficulties encountered with prior devices, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes are are intended to be broadly construed.

Moreover, the description and illustration of the invention is by way of example, and the scope of the invention is not limited to the exact details of the construction shown or described.

Having now described the features, discoveries and principles of the invention, the manner in which the improved automatic meat mixer and grinder is constructed, assembled and operated, the characteristics of the new construction, and the advantageous, new and useful results obtained; the new and useful structures, devices, elements, arrangements, parts, and combinations are set forth in the appended claims.

I claim:

1. A meat mixer and grinder construction including a tub having a generally flat bottom; a central post in the tub; means for rotating said post in forward and reverse directions; arm means mounted on the central post and extending towards the peripheral portion of the tub; paddle means pivotally mounted on the arm means and extending vertically downwardly therefrom terminating adjacent the bottom of the tub, said paddle means being adapted to swing upwardly in only one direction from the vertical position; cutter means mounted on the central post and extending outwardly therefrom toward the peripheral portion of the tub; the cutter means having a horizontal shaft with a plurality of knife means mounted thereon, and grate means; means for rotating the shaft and knife means; the grate means being positioned adjacent the knife means and forwardly of the cutter shaft in the direction of forward rotation, and cooperatively associated therewith whereby the knife means when rotating move downwardly through slots formed in the grate means; a generally radially disposed auger trough in the bottom of the tub; a feed screw in said trough; and means for rotating said feed screw.

2. The construction defined in claim 1 in which the arm means includes a pair of horizontally extending arms spaced approximately 115° apart; in which the axis of each arm is parallel with and spaced from an imaginary radial line extending from the central post; in which one of said arms is spaced approximately 105° from the cutter means horizontal shaft; and in which the other of said arms is sapced approximately 140° from said cutter means horizontal shaft.

3. The construction defined in claim 1 in which the paddle means has outer and inner edges; in which the outer edge is forwardly of the arm means in the direction of reverse rotation; in which the inner edge of said paddle means is located adjacent the central post; and in which said inner edge is rearwardly of the arm means in the direction of reverse rotation.

4. The construction defined in claim 1 which the paddle means is adapted to swing rearwardly upwardly when the central post is rotating in the forward direction; and in which retaining means prevent the paddle means from pivoting rearwardly upwardly when the central post is rotating in the reverse direction.

5. The construction defined in claim 1 in which the knife means includes cutting and mixing blades, in which each blade is flat having four edges arranged in the general shape of a parallelogram; in which a pair of diagonally opposite edges are convexly curved and are tapered to form cutting edges; and in which said cutting edges terminate in blunt tip portions, said tip portions being normal to the longitudinal axis of the blade.

6. The construction defined in claim 5 in which the longitudinal axes of adjacent knife blades are normal to each other when mounted on the horizontal cutter shaft.

7. The construction defined in claim 1 in which the grate means includes a grate formed by a plurality of upwardly forwardly extending spaced parallel bars; in which the grate has upper and lower ends; in which the grate is pivotally mounted adjacent its upper ends; in which the grate lower end is spaced above the tub bottom wall; and in which said grate is adapted to swing upwardly rearwardly.

8. The construction defined in claim 7 in which the grate includes first and second stop means; in which said first stop means spaces the grate lower end above the tub bottom wall; and in which the second stop means limits the upwardly rearwardly swing of said grate.

9. The construction defined in claim 5 in which the grate means includes a grate having a lower end, said lower end being spaced above the tub bottom wall; and in which the bottommost blunt tip of each blade is forward of the grate lower end when the longitudinal axis of said blade is in a vertical position.

10. The construction defined in claim 1 in which the central post is hollow; in which the means for rotating the horizontal cutter shaft includes an electric motor having a vertical drive shaft; in which said motor drive shaft extends into the central post; in which gear means is mounted within the central post; and in which the cutter means horizontal shaft is drivingly engaged with said electric motor shaft through said gear means.

11. The construction defined in claim 1 in which the arm means includes a pair of horizontally extending arms; in which the cutter means includes a horizontal frame member mounted on and extending outwardly from the central post; in which a ring is located within the tub adjacent the periphery thereof; and in which the outer ends of said arms and frame member are mounted on said ring.

12. The construction defined in claim 11 in which a triangular-shaped scraper member is mounted on the ring; and in which said scraper member extends vertically downwardly along and adjacent to the tub side wall.

13. The construction defined in claim 1 in which the cutter means includes a horizontal frame member extending outwardly from the central post and spaced above the cutter means horizontal shaft; and in which a deflector plate is mounted on said frame member and extends downwardly rearwardly therefrom spaced above the rotary knife means.

14. The construction defined in claim 1 in which the cutter means includes a horizontal frame member mounted on the central post and extending outwardly therefrom to the tub periphery, said frame member being spaced above and parallel to the cutter means horizontal shaft; in which horizontaal bracket means is mounted on said frame member and extends forwardly from and normal to said frame member; in which the grate means includes a grate having a plurality of spaced parallel bars; in which said grate is pivotally mounted on the horizontal bracket means and extends downwardly rearwardly toward the tub bottom wall; in which a first stop member is mounted on one of the grate bars and engages the grate bracket means limiting the downward swing of the grate; and in which a second stop member is mounted on the grate and engages the grate bracket means limiting the upward swing of the grate.

* * * * *